United States Patent [19]

Stauber

[11] Patent Number: 5,664,928
[45] Date of Patent: Sep. 9, 1997

[54] COMMISSIONING PROCESS AND APPARATUS

[75] Inventor: Hans-Ulrich Stauber, Grüt, Switzerland

[73] Assignee: Ferag AG, Hinwil, Switzerland

[21] Appl. No.: 682,081

[22] Filed: Jul. 16, 1996

Related U.S. Application Data

[63] Continuation of Ser. No. 248,432, May 23, 1994, abandoned.

[30] Foreign Application Priority Data

Jun. 4, 1993 [CH] Switzerland ............... 01684/93
Apr. 20, 1994 [CH] Switzerland ............... 01207/94

[51] Int. Cl.$^6$ ..................................... B65G 1/04
[52] U.S. Cl. ..................... 414/269; 414/286; 414/281
[58] Field of Search ........................ 414/270, 273, 414/286, 268, 269, 281, 285, 789, 786

[56] References Cited

U.S. PATENT DOCUMENTS

| | | | |
|---|---|---|---|
| 3,863,777 | 2/1975 | Murata | 414/285 |
| 4,712,964 | 12/1987 | van Elten et al. | 414/281 |
| 4,950,119 | 8/1990 | Nord et al. | 414/281 |
| 5,125,782 | 6/1992 | Goldschmidt et al. | 414/285 |
| 5,238,349 | 8/1993 | Grace, Sr. | 414/269 |
| 5,395,205 | 3/1995 | Cerny, Jr. | 414/270 |

FOREIGN PATENT DOCUMENTS

| | | |
|---|---|---|
| 0 457 158 | 11/1991 | European Pat. Off. . |
| 40 21 665 | 1/1992 | Germany . |
| WO87/01102 | 2/1987 | WIPO . |

*Primary Examiner*—Karen B. Merritt
*Assistant Examiner*—Gregory A. Morse
*Attorney, Agent, or Firm*—Walter C. Farley

[57] ABSTRACT

In a commissioning process, variable lines are produced from articles of a variable supply of goods wherein each line consists of a selected number of groups consisting of a variable number of articles of the same type. A dispenser arrangement with a dispenser ($D_{xyz}$) with an inlet matrix (SE) and an outlet matrix (SA) and buffers (P) between the matrices is used. Articles assembled into transport units with auxiliary packaging and/or transport material are supplied to the dispenser arrangement. The articles are individualized from the transport units of goods, the individual articles are fed through the inlet matrix into the buffers and transported in the buffers to the outlet matrix. From the outlet matrix articles are removed to collect lines of a predetermined combination and the collected articles are assembled to form line units using auxiliary packaging and/or transport material. The auxiliary packaging and/or transport material is supplied from the individualization step to the line assembly step. The dispenser ($D_{xyz}$) is an assembly of x times y buffers having a capacity z. If at the inlet (SE) in each of the buffers always the same product is introduced, then in each plane from SE to SA the "profile" is the same and the buffer is ungrouped. However, as soon as the product type at the inlet SE changes, then the particular buffer is grouped, its capacity is subdivided into different capacities $Z_{partial}$ and there is a profile within the dispenser. It therefore becomes possible to always operate the dispenser with its maximum variety, which greatly increases the commissioning throughput.

7 Claims, 7 Drawing Sheets

COMMISSIONING PROCESS AND APPARATUS

This is a continuation of Ser. No. 08/248432, filed May 23, 1994, now abandoned.

FIELD OF THE INVENTION

The invention is in the field of the conveying of goods and relates to a process for producing, from a random supply of goods, random lines of products by combining random groups of products, as well as to an apparatus for performing the process.

BACKGROUND OF THE INVENTION

Commissioning, the activity of producing lines of products, is a process in which by selecting and combining elements from a plurality of different goods a plurality of element groups is formed. An example is ordering in a department store, where from an overall (basic) assortment or line, a particular order is realized as an ordered assortment or line by selecting groups of elements of different goods and combining the groups. This process can be performed manually or automatically by machines.

The combining or bringing together of a plurality of element groups is a tedious task and involves high logistic expenditure. Frequently this monotonous activity is personnel-intensive and as a result of the high demands on humans is fault-prone. Virtually all organizations are affected as a result of the numerous demands on incoming and outgoing products and there is also a variety of commissioning tasks within an organization, e.g. in stock administration, ordering, work preparation, production, storage and despatch.

An apparatus for assembling product lines (commissioning) and a method for running such apparatus are described in the European patent application No. 91107393.0 (publication No. EP-A1-0457158).

SUMMARY OF THE INVENTION

An object of the invention is to provide a very flexible, but still simply functioning process for the selecting-supplying-grouping of a random number of goods or for forming lines of random numbers of randomly sized groups of articles respectively and to provide an apparatus for performing the process, which apparatus and process are improved compared with apparatus's and methods for the same object according to the state of the art. It will be recognized that the term "line" refers to a number of items or groups which have a common future, such as items belonging to the same customer order, and corresponds to the term "order" in some publications.

A few observations will firstly be made concerning the problem involved. Consider a distribution matrix for the incoming goods and a distribution matrix for the outgoing goods wherein each matrix point of one matrix is connected to each matrix point of the other matrix, then in optional access any one of the entrances can be connected to any one of the exits and consequently at any time, selectable groups of outgoing elements of the goods involved can be formed from any of the incoming elements. The incoming product flow would consist of the total of the goods concerned and the outgoing flow would consist of the desired groups or lines. An apparatus for performing such a process would be extremely complicated and inconvenient. However, if an inlet matrix is appropriately connected in some other way with an outlet matrix and a product and time buffer is also incorporated, there is a great simplification to the problem. Such a system can e.g. be rigidly or spontaneously timed. The larger the matrix and therefore the variation possibilities, the more appropriate becomes spontaneous timing for initiating delivery processes. In other words, a delivery of a product takes place individually.

A 10x10 inlet matrix can receive 100 different products and a 10x10 outlet matrix can (simultaneously) deliver these 100 different products. This corresponds to the "variety" of the system, e.g. V=100. If, between points of the inlet matrix, and points of the outlet matrix buffers are provided, the buffers each can have a "buffer capacity", e.g. z=10, which would mean that 10 products can be housed in one of the buffers. The total of the points of the inlet or outlet matrix and of the buffer capacity corresponds to the "capacity" of the system, e.g. K=(V times z)=100×10 =1000 articles, which can be present in the system at one time. These can be 1000 identical or 1000 different articles. If each point of the inlet matrix is connected to the same point of the outlet matrix, crossing-free channels are obtained as buffers and for carrying through the products. The channel length determines the buffer capacity, the total number of channels the variety and the capacity, K=(z times V). For loading and unloading the buffers e.g. gripping members are provided, which in optional access work the matrices in program-controlled manner.

Such an apparatus in the form of a type of dispenser is virtually ideal for the rapid and very flexible distribution of products. As a result of the given symmetry the dispenser can also operate alternately, i.e. also "in reverse", so that a first-in-first-out and a first-in-last-out operation is possible.

Incorporated into a product supply system for supplying goods to the dispenser and a product delivery system from the dispenser, the dispenser is generally only used in one direction (first-in-first-out). The function of the dispenser is completed by a supply device in the manner of a distributor for controlling the "cells" of the inlet matrix and a similar or identical, but independently operating removal device, which assembles the lines from the outlet matrix in a predetermined way. Between the supply and removal points is positioned the buffer (in the form of a through shaft for receiving articles). It contains a plurality of articles of the same type or different types.

For introducing articles into the inlet matrix of the dispenser, these articles have to be individualized from a supplied plurality of such articles, by separating them from auxiliary transport and/or packaging material such as pallets or containers. The lines prepared by taking articles from the outlet matrix of the dispenser have to be assembled by piling or packaging on pallets or in containers. For these method steps the inventive apparatus features a bypass of the dispenser working in the same direction as the buffers for transporting auxiliary transport and/or packaging material as pallets or containers from the entry of the goods to the dispenser arrangement to its exit.

A master logistic plan controls the supply of products from a store and the predetermined combination of the products to form the desired lines, as well as the return of the lines to the store. The same logistic plan advantageously controls also the individualization of the articles to be introduced into the dispenser and the assembly of the lines consisting of the articles removed from the dispenser to form units suitable for transport.

The requirement on the removal side is that all articles required for a specific line or order, are ready on the removal side of the dispenser.

The product supplier operates on the supply side of the dispenser and uses the overall warehouse. The requirement on the supply side is that there must be a space for all products which are to be introduced into the dispenser.

In the simplest form each buffer contains articles of the same type, but this restricts the variety of the dispenser or the number of different lines theoretically producible with it.

A dispenser $D_{xyz}$ with (x times y) inlets/outlets and a buffer length l with a buffer capacity z gives a maximum dispenser capacity $K=K_{xyz}=$(x times y times z, or xyz) elements and a maximum dispenser variety $V_{max} K_{xyz}$ elements. In the case of the maximum variety $V_{max}$ the capacity consists of unequal elements (goods). A restriction of the variety can take place in such a way that each buffer P contains identical elements (V=xy). A further restriction would be that each row of buffers contains the same elements (v=x or v=y). The minimum variety $V_{min}$ in is obtained if all the buffers contain the same elements ($V_{min}=$ 1). If a buffer is timed with z cycles without resupply, then the buffer is empty. The capacity of a given dispenser $D_{xyz}$ does not change but it can be utilized fully or only partly. Partial utilization can be advantageous, e.g. for ensuring that there is space for product resupply on the supply side, or e.g. in order to form an empty buffer for a freely timed operation. However, the variety V can be randomly modified between $V_{min}$ and $V_{max}$ and can be adapted to circumstances. Lines S consist of at least two groups G, each group having a random number g of similar elements (group size). A zero line consists of only one group of identical elements. A maximum line and consists of a plurality of groups with only one element per group. All desired lines are possible between a zero line and a maximum line. In a limiting case, $S_{max}$ can reach $V_{max}$ for z buffer cycles, but this only has a theoretical value. The most frequent operation of the dispenser is similar to that of a single item store, in which each buffer contains identical elements and the variety is V=xy for a capacity of K=xyz. The group formation within the variety V, i.e. the number of lines S, is then determined by the sequence (1 from xy, 2 from xy, 3 from xy ... xy from xy). In the case of a large buffer, e.g. z>100, it can be organized groupwise i.e. a variety change is realized within the buffers. The actually handleable variety only manifests itself at the dispenser outlet, but in the buffer there can be a predetermined (programmed) variety change with a specific cycle remoteness and after a number of cycles can become the actual variety.

The outlet matrix of the dispenser, e.g. $D_{10,10,10}$ constitutes in itself a line S with $V_{10,10}$ i.e. a basic line S with 100 groups with one item each. If the dispenser is operated as a single item store, then each buffer P contains a number z, i.e. 10 articles. The combination to form lines takes place in the selection of the number of groups G of 100 articles, each group having a random number g of identical articles, which are e.g. timed into the actual line. In actual fact such dispensers are much larger, e.g. $D_{80,80,100}$ which corresponds to a capacity of 0.64 million articles. As a result of the buffer per se and its length, it is possible to provide for a change in the basic line, so that after a given number of product removal cycles a different basic line is available on the outlet side of the dispenser. In the case of a variety of $V_{80,80}=6,400$, a removal means (robot) can continuously combine and deliver random lines with any number of similar and/or different articles. The supply means (robot) also operates continuously on the other side of the dispenser and from a warehouse with e.g. 6.4 million articles always replaces the removed articles and combines the new basic line.

The few examples discussed hereinbefore show the vast potential of such a dispenser operation with integrated management of auxiliary transport and/or packaging material. It permits to produce a time-uninterrupted, automatic flow of article lines without any restriction. The content of any warehouse size can be continuously broken up into lines completely automatically with one or more dispensers as described.

BRIEF DESCRIPTION OF THE DRAWINGS

An embodiment of the invention is described in greater detail hereinafter relative to the drawings, wherein.

DESCRIPTION OF THE PREFERRED EMBODIMENTS

Figure 1:
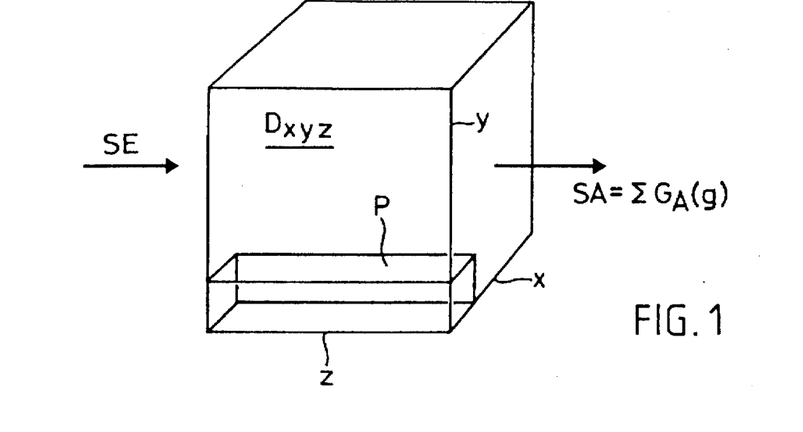
FIG. 1 is a schematic diagram of an abstracted dispenser for defining certain of the terms used above.

FIG. 1 shows an abstracted dispenser $D_{xyz}$ with x times y buffers P with a capacity z. To the left an arrow SE shows the product entry (virtual lines, i.e., articles which are entering into the system and will become parts of lines or orders in the future) into the dispenser and to the right an arrow SA shows the product exit (real lines, i.e., articles which have been assembled into lines or orders) out of the dispenser, each outgoing line representing a sum of groups G of a size g. An example of a buffer P with the capacity z is shown in a lower corner.

A master control means I for controlling the inlet and outlet sides of the dispenser, in accordance with the master logistic plan mentioned above, is also shown in FIG. 1.

Figure 2:
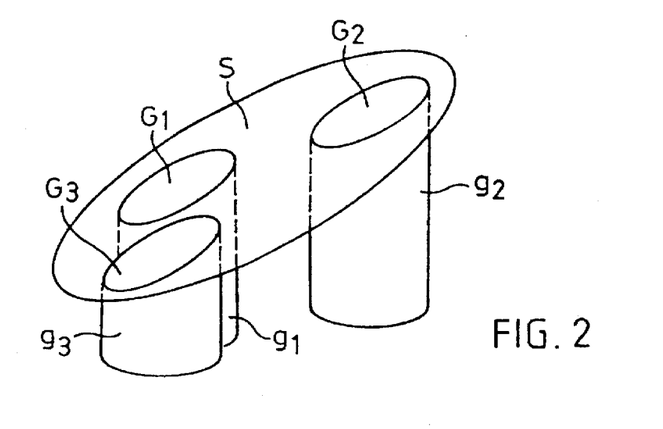
FIG. 2 is a diagram of a group formation and a group capacity.

A typical line S with a number of groups $G_1$, $G_2$, $G_3$ each with a group size $g_1$, $g_2$, $g_3$ is shown as a quantity diagram in FIG. 2. This more particularly shows that in a line there can be groups $G_m$ of different sizes $g_n$, in other words a line may contain different numbers of articles in each group and this is in fact the normal case. Despite the "clocking out" of products in a sort of removal plane, it must be possible to remove any number of elements from any buffer. If the same type of article is always introduced into each one of the buffers at its inlet SE, then in each plane between inlet and outlet the "line profile" is the same, i.e. the buffers are ungrouped. However, as soon as the article type at the inlet SE is changed, then the particular buffer is grouped, its capacity being subdivided into different capacities $Z_{partial}$ and there is a non-uniform "line profile" within the dispenser. This offers the possibility of always operating a dispenser with a variety V which is at least equal to xy and therefore the possibility of greatly increasing the throughput and of keeping it permanently high in automatic operation.

Figure 3:
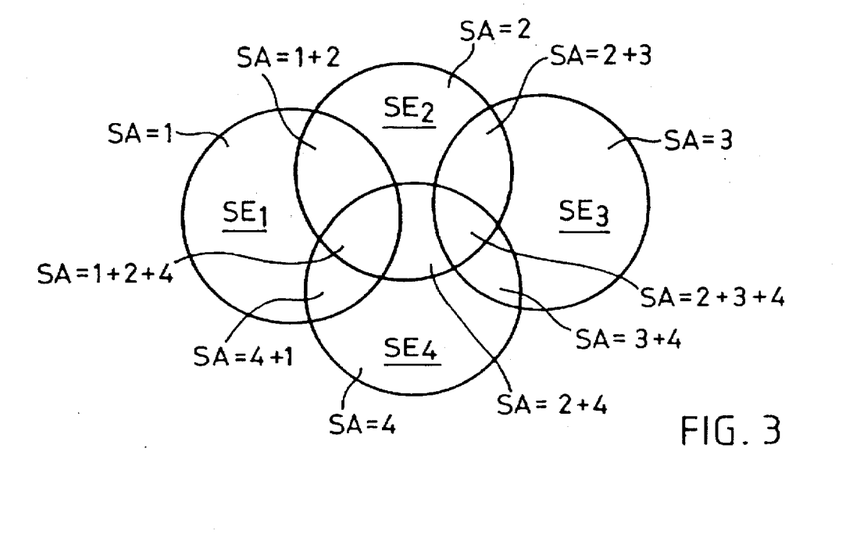
FIG. 3 in an example of the formation of a real line illustrated as quantity diagram.

FIG. 3 shows an example of incoming quantities SE and outgoing quantities SA as a quantity diagram, whose overlapping is chosen completely randomly. This Figure illustrates that when programming the quantity formation complete freedom exists. So as not to overburden the representation, in the chosen example the buffers are only loaded with a single product type. In addition, this quantity diagram with only four buffers can be looked upon as part of a dispenser variety (partial variety or subvariety) of a much larger number of buffers. This once again shows how a partial variety can be prepared in programmed manner independently of the maximum variety $V_{max}$ and can then be incorporated into the overall entity. As in the case of the partialization of the buffers, partialization of the variety also offers the possibility of progressively performed changes. In order to illustrate a variety of e.g. 1000, a quantity diagram would be completely unsuitable, because, particularly in the case of a dynamic profiling of the buffer (change or partializing the buffer content) not only would the outgoing quantities, but also the incoming quantities would change constantly.

The goods of the quantifies $SE_1$ to $SE_4$ (S for line) are introduced into the particular buffers, which takes place by means of an e.g. cartesian-oriented product gripper or some other cartesian-controllable supply or removal member. Such a supply member fills with products the four buffers, which need not be juxtaposed and in operation are generally not even close to one another. This process can also be looked upon as a subtask, namely that a product change is affected for the buffers 1,2,3,4 (or any random buffer, e.g. not shown buffers 10,33,5,18), which would correspond to the aforementioned partialization. An also cartesian-oriented removal member is then able to combine one or more or all the given lines SA with randomly large groups G with a group size g. Whilst this is taking place, a new partial variety can be programmed, which combines a different number of buffers, wherein for some of these buffers the refill product may have to be changed, for others it may remain the same.

The system with partial variety and non-uniform buffer content permits a flexibility of the dispenser $D_{xyz}$ in such a way that, assuming sufficiently large buffer capacity for corresponding cycle times, a flow of random virtual lines S flows through the dispenser and can be removed at its outlet side. The changing variety is enormous and can scarcely be utilized, this being achieved with a relatively simple apparatus.

Within the buffer a conveying mechanism ensures the passing through of the products from the inlet to the outlet, e.g. by belt conveying, sliding, rolling and other conveying forms. Preferably there is a spontaneous conveying on request. For this purpose the removal means, which collects the articles for the desired lines, can have a proximity sensor. When it approaches the outlet of one of the buffers, the conveying mechanism of the buffer is moved by one cycle. If the cycles in each buffer are counted and related to articles present in the buffers, the simulation of all the cycles (xyz cycle field) represents all the quantities, the partial variety and the partial buffer capacity. The partial xy cycle field simulates the variety and the partial z cycle field the partial buffer capacity. Thus, the entire product flow through the dispenser and the entire commissioning program can be represented by the abstract, but directly technically realizable cycle field.

In order to remove a further article from the same buffer, the removal member repeats the removal process, i.e. a moving in/away, in order to reactivate the proximity sensor. Thus, without great effort and expenditure and with no switches or crossings and with relatively simple mechanisms, a large selection of goods can be managed by the dispenser. Larger dispensers have several coordinated removal means or a larger variety plane is broken down into functional "removal fields", in which in conflict-free manner only one removal member is operating. This can also be used on the entry side for dynamic equilibrium. It is also not necessary for both, supplying and removal means, to be continuously operated at the same working speed.

Figure 4:
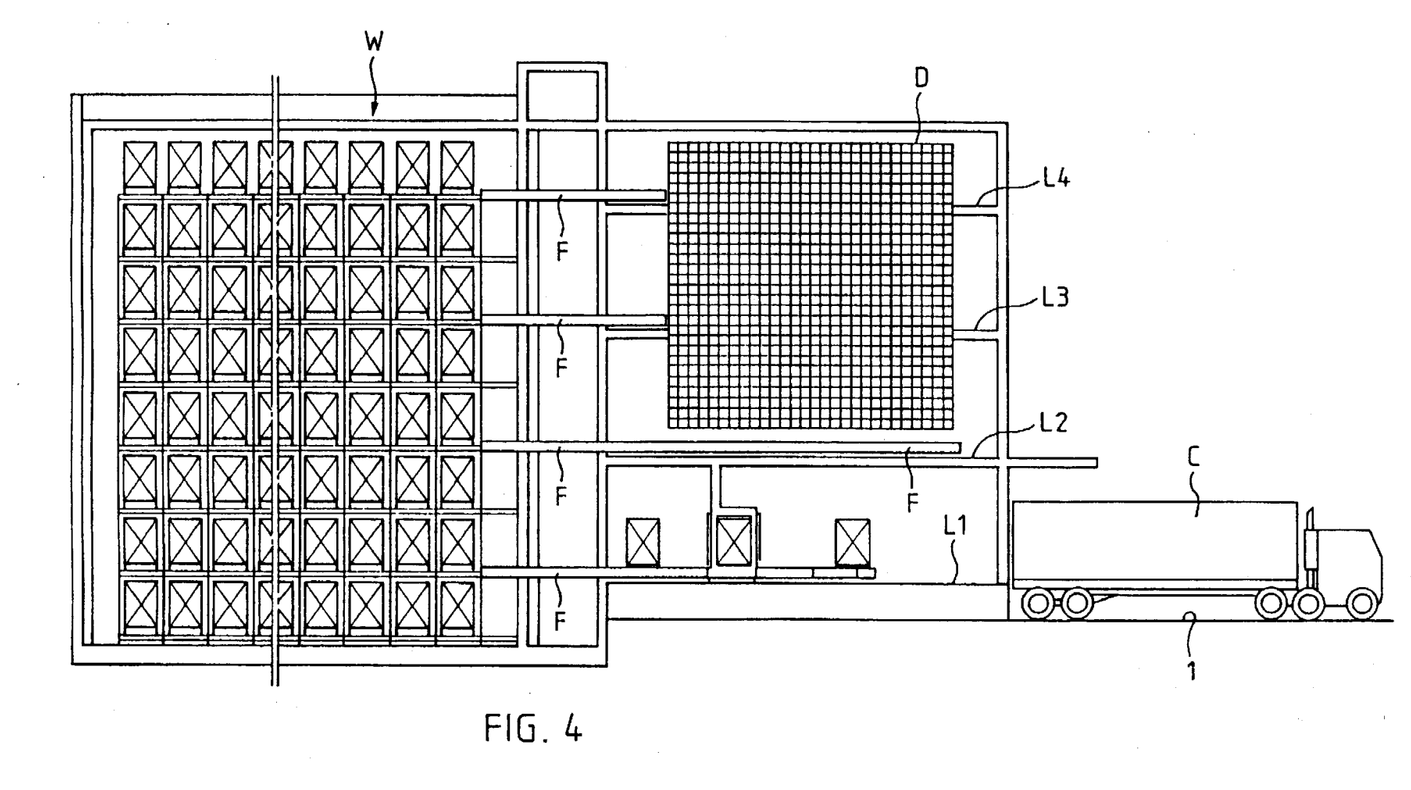
FIG. 4 is a schematic a side elevation of a typical warehouse with a dispenser arrangement.
Figure 5:
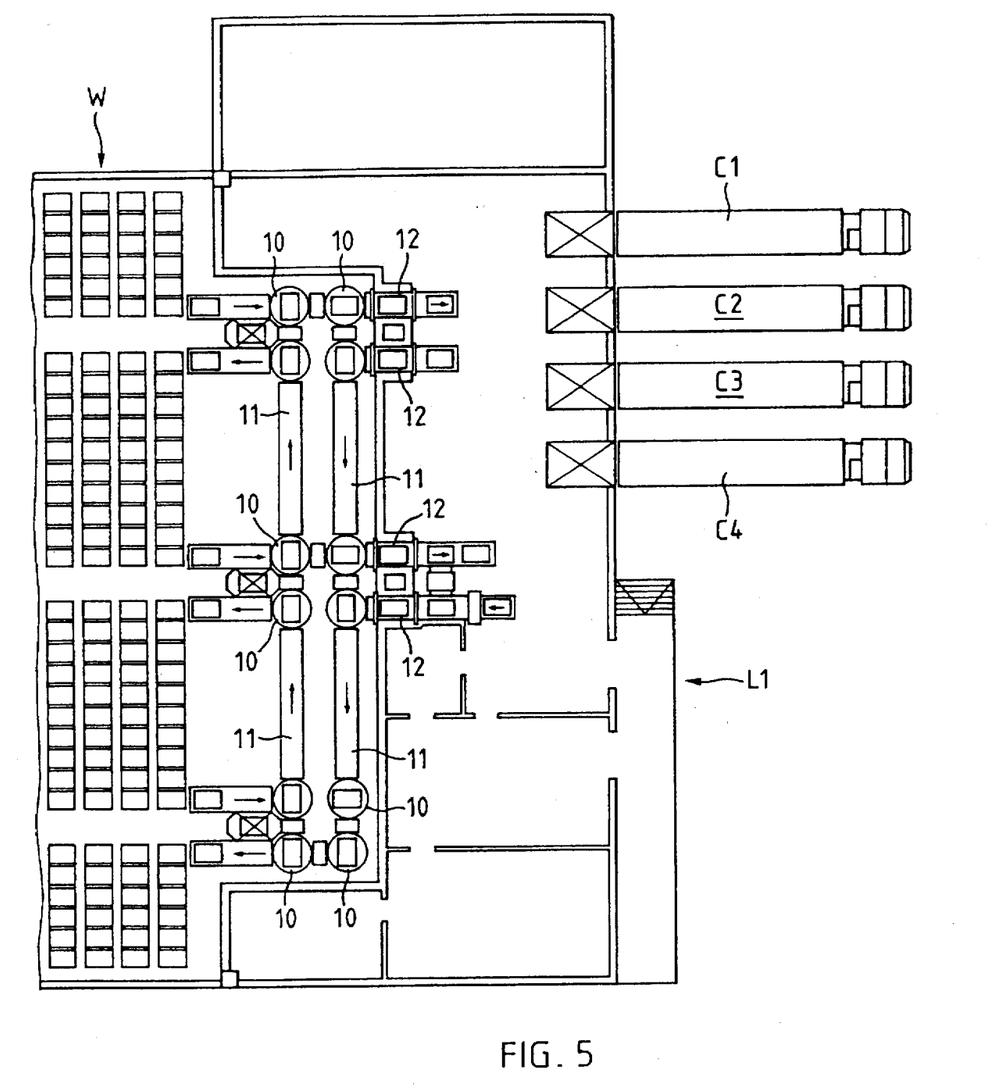
FIG. 5 is a schematic plan view of the bottom (first) level of the warehouse of FIG. 4.

FIG. 4 shows an elevation of an example of a warehouse with a dispenser arrangement D. To the left there are several floors L, in this case four levels L1–L4 with the goods stored on pallets, whilst to the right can be seen a dispenser (here 28×28) for a variety of 784 buffers. The stock W and dispenser D are interconnected in the x,y,z direction by conveying means F. To give an idea of the size of the whole arrangement, to the bottom right on level 1 a truck C is shown. At this level the goods are supplied from outside and also delivered to the outside. The goods are e.g. stacked on pallets in stacks of articles of the same type. They are then individualized (separated from pallets) and fed into the dispenser and the empty pallets are transported with corresponding transport means to the product exit of the dispenser arrangement for being used for assembling the articles of produced lines into transport units. Thus, in addition to a continual product flow, there is an organized pallet flow. In addition to pallets, other packaging or transport containers may be used also. In the case of standard pallets and the obligation to use these, the pallet cycle is extended to the receivers of the produced lines and is concentrated in the area of the warehouse and the dispenser.

FIGS. 5, 6, 7 and 8 show the different levels of the set up of FIG. 4 in plan view. On the bottom level L1 (FIG. 5) there is e.g. the organizational infrastructure, namely offices, despatch, power, general traffic areas, etc., including the four docked trucks C1–C4. In the drawings the arrows indicate conveyor belts 11 representing the product flow. The different levels are interconnected by vertical elevators 12 with which the products and the empty pallets are conveyed from and to the different floors. The reference numeral 10 indicates crossings or turntables for the transfer of the pallets from one conveyor to another one. The product flow in the store, i.e. the quantity of uncommissioned and commissioned products, is not under consideration here. The main point of interest is the product flow from and to the dispenser or dispenser parts and the flow of transport and/or packaging material (pallets, containers) from the product entry to the product exit of the dispenser arrangement. As the dispenser can easily be subdivided into subvarieties a dispenser having a height of several floors can be organizationally and locally broken down into a random number of parts, which can also be interconnected without difficulty.

Figure 6:
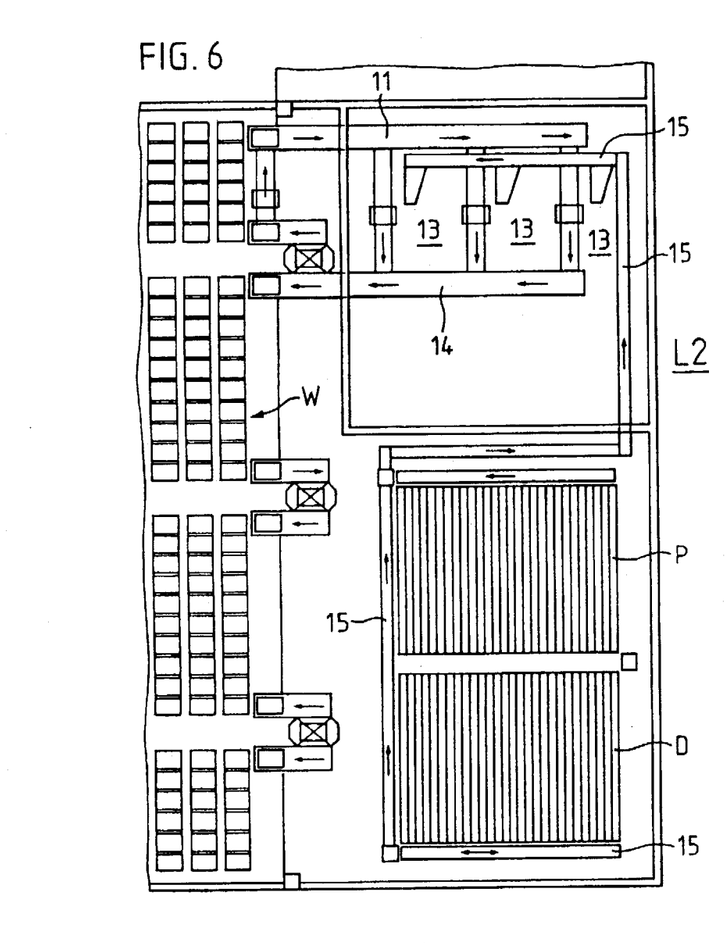
FIG. 6 is a schematic plan view of the second level of the warehouse of FIG. 4.

FIG. 6 shows in the second level L2 the lower part of the dispenser D. The dispenser is divided into two organizational pans and is loaded from a middle shaft. As a result of this subdivision the variety can be increased, namely doubled at the two outlet sides. If lines are to be formed in which some articles occur very often and/or in great numbers whereas others occur in a variable manner, the inlet matrix (middle of the dispenser) of each dispenser part can be loaded such that often and much used articles are available on the outlet side according to the law of shortest paths for removal. This constitutes an optimization task for the overall control.

In this second level, there is e.g. a plurality of manual palletizing stations 13. The empty pallets are supplied to the palletizing station on a conveyor belt 11 and they are manually filled with goods, which are supplied from the dispenser on the conveying means 15 in a predetermined sequence according to the composition of the lines to be assembled. The loaded pallets pass on a further conveyor belt 14 into the store W again, from where they can be shipped at the intended time. The cartesian-oriented gripping member, extracting the articles from the dispenser and such forming the sequence of articles to be supplied to the palletizing station, is not shown here and is diagrammatically illustrated in connection with FIGS. 9 and 10.

Figure 7:
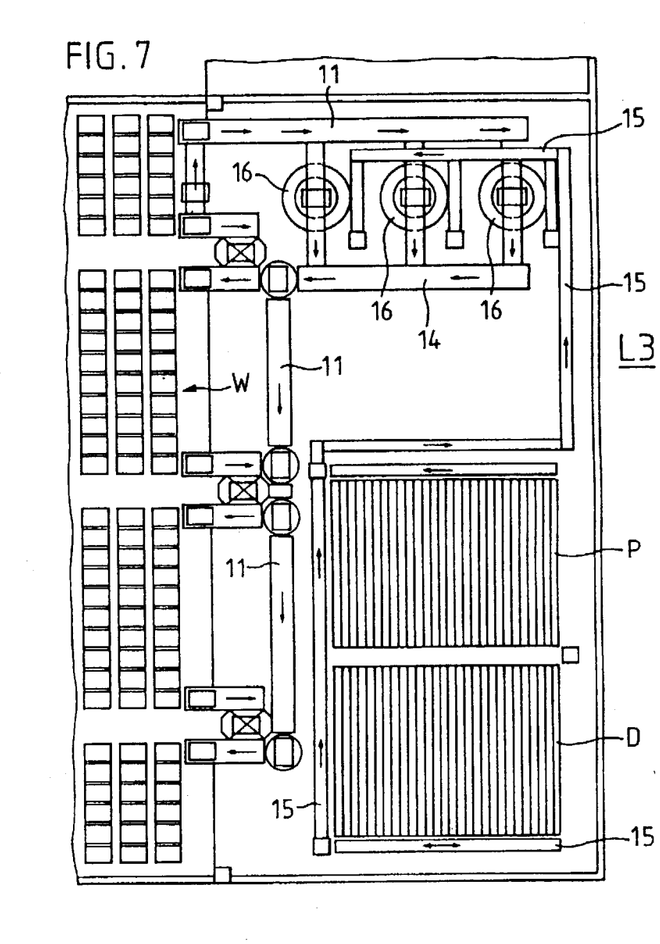
FIG. 7 is a schematic plan view of the third level of the warehouse of FIG. 4.

FIG. 7 shows the third level L3 with the central part of the dispenser D and a station for automated palletization. For fully automated commissioning such elements as elements for palletizing must be automated also in order to replace the manual activity. FIG. 7 shows three palletizing devices 16, which receive the empty pallets from the conveyor belt 11, load them with products being delivered in the desired sequence on conveyor belt 15 from the dispenser and hand them over to conveyor belts 14 or 11 for transportation into the store W. A cartesian-oriented gripping means forms the line sequence by removing the adequate articles from the dispenser. It is controlled on the basis of information about all the cycle times (xyz cycle field). The delivery cycle field, which contains all the product elements, which are available from the dispenser in the next cycle, contains the "virtual" lines, which are converted by the gripper into real lines and are then palletized. Under certain circumstances this activity may only regard a small part of the dispenser, from which articles are extracted in a clocked manner and according to the respective group sizes. Considered individually and from a theoretical standpoint, after each clocked extraction there is a new content of the outlet matrix, which allows new line formations, but in reality this only applies if through the clocked removal of articles different new products appear in the outlet matrix.

Within the xyz cycle field, virtual removal cycle fields are formed and defined, which at a given time form a real removal cycle field and which are time-organizable through the buffer length. It is not necessary to define the buffer capacity z solely by its length. Use can also be made of the cross-section, e.g. in the case of certain products four units per extracting cycle. However, these details can be left to subsequent standardization, only the basic principle being discussed here.

Figure 8:
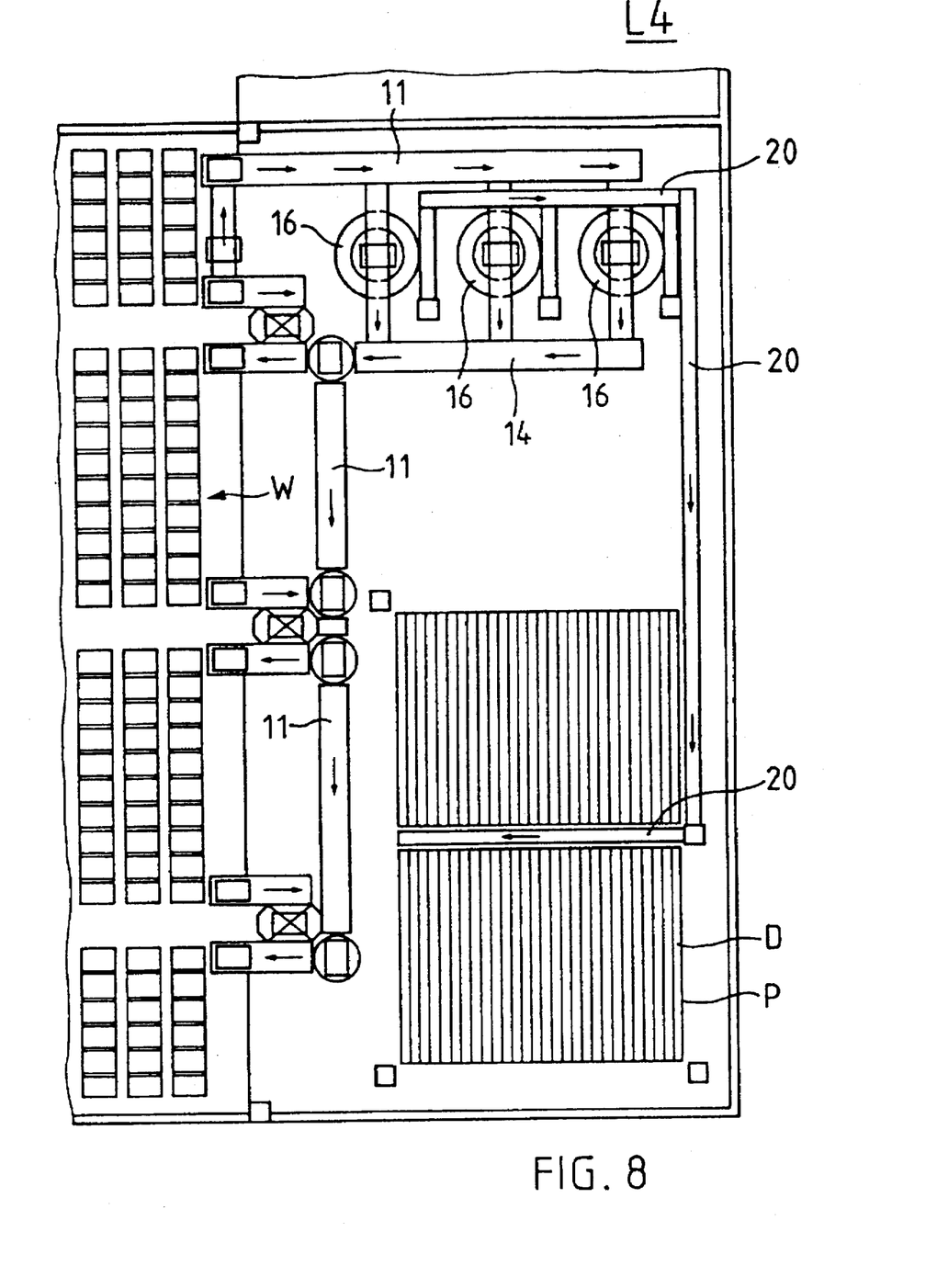
FIG. 8 is a schematic plan view of the fourth (top) level of a warehouse of FIG. 4.

FIG. 8 shows the top level L4 which forms the "supply level" or product entry to the dispenser arrangement. The dispenser is such organized that the loading of the buffers takes place from the middle of the dispenser and from above through the central shaft. On the very top of the Figure the supply path 11 from the store is visible. On this path goods on pallets are supplied to three depalletizing devices 16. By these depalletizing devices the goods are taken from the pallets, individualized and handed over to the supply belts 20 on which they pass to the two inlet planes in the center of the dispenser. In the same manner, it would be possible to supply the dispenser with goods from the bottom level or with two supply devices from the bottom and the top level simultaneously. The arrows in the Figure indicate one of several organization possibilities. As in the next lower level, the pallets (empty) are conveyed away via the return conveyor belt 14 and by the vertical transportation means to the lower levels to the palletizing stations. This process measure of an integrated circulation of the pallets (or containers) within the overall process and the apparatus for conveying the empty pallets, permit an efficient and very flexible management of transport and/or packaging material (pallets and/or containers).

Figure 9:
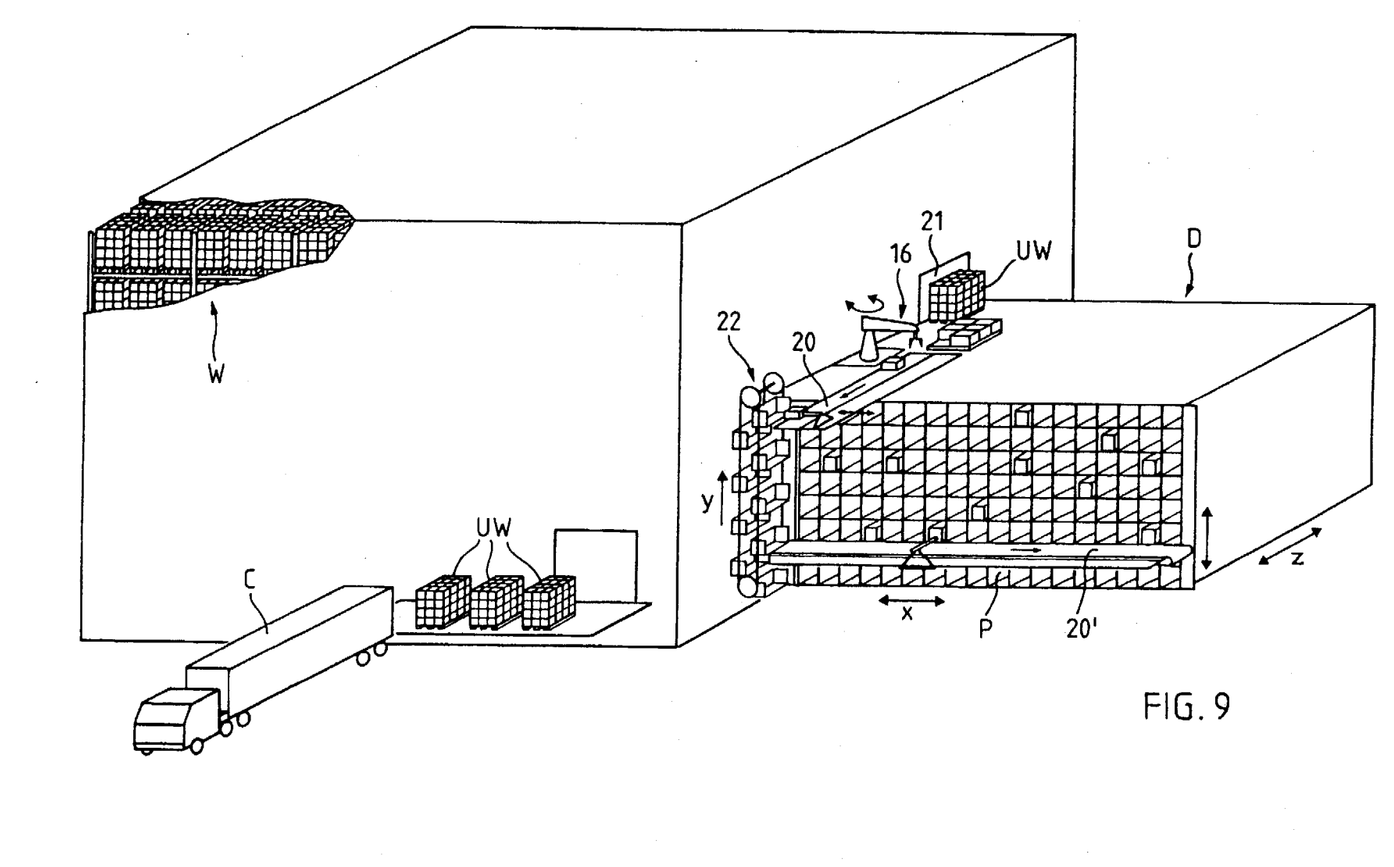
FIG. 9 is a three-dimensional view of a warehouse with an attached dispenser, seen from the inlet side of the dispenser.

FIG. 9 is a perspective view of a high shelf warehouse W with an attached dispenser block D, viewed from the supply side of the dispenser. Obviously, this drawing represents an extreme simplification as to architectural detail, but it clearly shows the overall nature of the relatively complex invention. A truck C illustrates the entry to the warehouse for unsorted goods UW, which are to be housed in the store W in the correct manner for a subsequent access. From said store the goods are brought on pallets from the opening 21 to the dispenser arrangement. The articles are depalletized and individualized by a depalletizing device 16 and they are brought via a conveyor belt 20 to an x, y, z conveying apparatus including a vertical conveying means (y-direction), e.g. an elevator 22, from where they are conveyed by a further conveyor belt 20' positionable within the "dispenser levels") in the x direction to the respective buffers P and are inserted into the latter. This diagrammatically represented apparatus is a cartesian-oriented gripper mechanism, which can naturally also be controlled in diagonal movement in order to permit a rapid, optional access. Within the buffers P the products are transported in a timed manner in z direction to the removal side of the dispenser. Only a few buffers are shown with articles so as not to overburden the drawing. Generally the dispenser is filled up to its productivity level, which is somewhat below its total capacity so as to always offer at least one free space.

Figure 10:
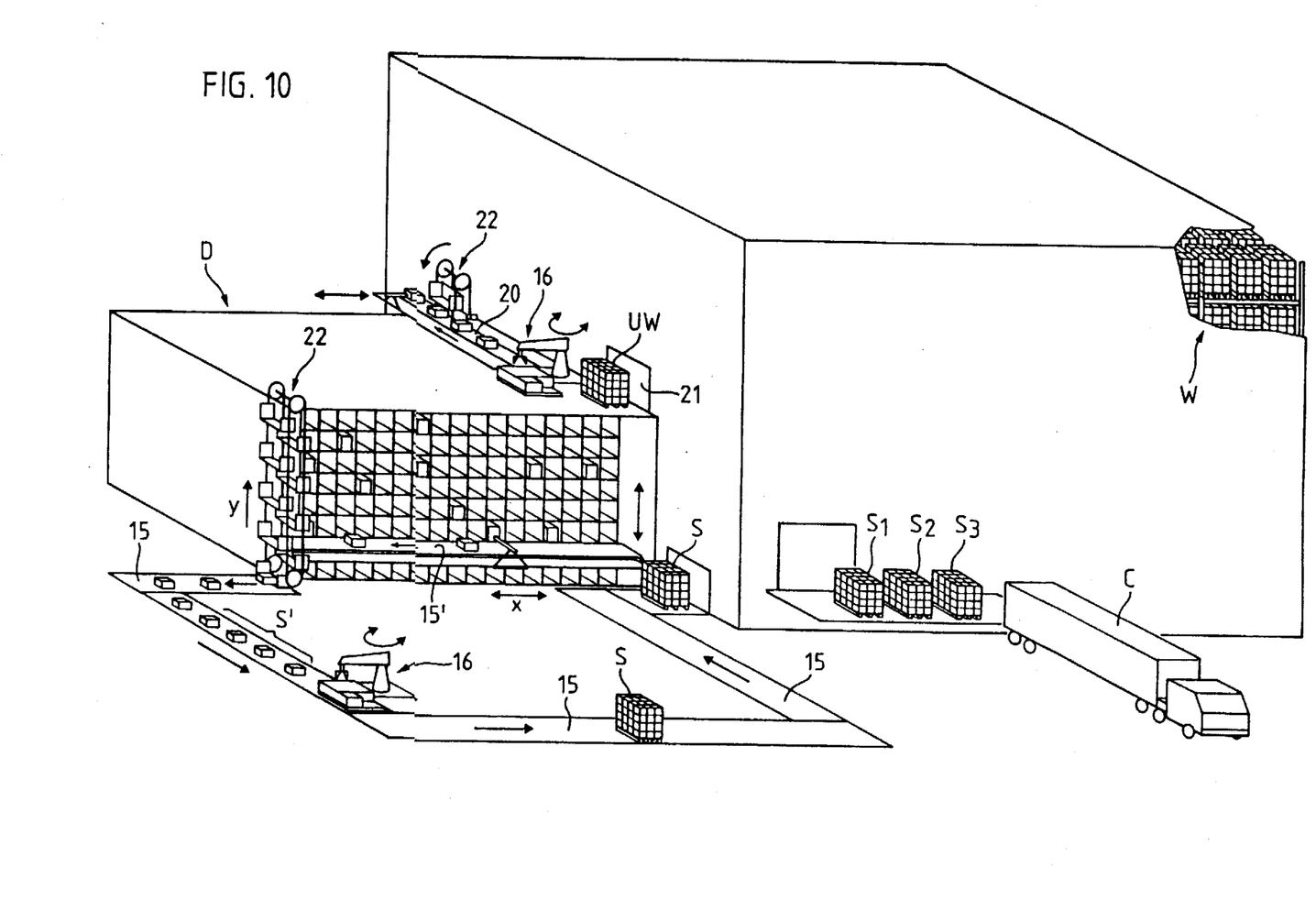
FIG. 10 is a three-dimensional view of a warehouse with an attached dispenser seen from the outlet side of the dispenser.

FIG. 10 shows the same building from the outlet side of the dispenser. On the top of the dispenser the supply path for goods UW to be commissioned through the outlet 21 is shown. The goods are depalletized by the depalletizing station 16 and supplied via the conveying means 20 to the vertical conveyor of the supply side of the dispenser, in this case a paternoster elevator 22 (FIG. 9). The articles ready on the outlet side are removed by the cartesian-oriented paternoster 22 and the conveyor belt 15' and are placed in the correct order 5' for palletizing on a supply belt 15 where, arranged in the form of a line, they are taken up by a palletizing member 16 and placed on a pallet. The above-discussed, overall pallet organization and its traffic paths are not shown in the drawing. These paths lead in a very effective way (shortest possible transport paths) from a depalletizing station to a palletizing station wherein these stations are located directly above each other. The full pallets provided with the desired lines S, $S_1$, $S_2$, $S_3$ are then delivered to the store or to the truck C, which distributes them at the destination addresses.

The principle would appear to be very simple, because technically relatively simple means can be used, but the internal organization on which it is based is very complex. It is not possible to envisage a commissioning, which cannot be implemented by the system with partial variety and non-uniform buffer content. This partial system is realized, e.g. by cycle fields within all cycle times (xyz cycle field) by a 1:1 relationship between article and transportation or removal cycle.

I claim:

1. A method for producing lines having predetermined compositions of selected items, the method comprising the steps of supplying a dispenser with a plurality of buffers wherein each buffer has an inlet only on an inlet side of said dispenser, an outlet only on an outlet side of said dispenser and a storage capacity of a plurality of items between the inlet and outlet, and means for transporting items from the inlet to the outlet, providing a plurality of supply units each comprising a plurality of items and auxiliary packaging and/or transport material containing or carrying the items, delivering supply units to an individualization station at which items of each supply unit are individualized and separated from the auxiliary packaging and/or transport material, feeding individualized items into the buffer inlets in a controlled manner, transporting the items stepwise in a controlled manner from the buffer inlets to the buffer outlets in response to the individual removal of items from buffer outlets, removing items in a controlled manner from the buffer outlets, conveying auxiliary packaging and/or transport material from the individualization station to a line assembly station, at the line assembly station, assembling the items removed from the buffer units into line units with auxiliary packaging and/or transport material conveyed from the individualization station, transporting the line units away from the line assembly station, and program controlling the inlet and outlet sides for keeping a variety of items available at the outlet side of the dispenser and a high throughput through the dispenser, by adapting an actual variety of items available at the outlet side to existing circumstances by filling at least part of the buffers with items of a type different from the types available at the outputs of the buffers whereby the different item types become part of a different actual variety after a plurality of removal cycles.

2. A method according to claim 1 wherein the auxiliary material comprises pallets.

3. A method according to claim 1 wherein the step of feeding individualized items into the buffer inlets in a controlled manner includes feeding the individualized items into the buffer inlets in a sequence determined by kinds of items to be required for lines to be assembled when the items are removed from the buffer outlets.

4. An apparatus for producing lines having predetermined compositions of selected items, comprising:

a dispenser comprising a plurality of buffers, each buffer having an inlet only at an inlet side of said dispenser, an outlet only at an outlet side of said dispenser and a storage capacity of a plurality of items between said inlet and outlet;

means for stepwise transporting items from each said inlet to said outlet in response to removal of an item from said outlet;

means for providing a plurality of supply units each comprising a plurality of items and auxiliary packaging and/or transport material containing or carrying said items to an individualization station and for individualizing and separating said items from each other and said auxiliary packaging and/or transport material;

means for controllably feeding individualized items into buffer inlets;

means for controllably removing items from said buffer outlets;

means for conveying auxiliary packaging and/or transport material from the individualization station to a line assembly station;

at said line assembly station, means for assembling items removed from said buffer units into line units with auxiliary packaging and/or transport material conveyed from said individualization station; and master control means for keeping a variety of items available at the outlet side of the dispenser and a high throughput through the dispenser by adapting an actual variety of items available at the outlet side to existing circumstances by filling at least part of the buffers with items of a type different from the types available at the outputs of the buffers whereby the different item types become part of a different actual variety after a plurality of removal cycles.

5. An apparatus according to claim 4 wherein said buffer inlets and buffer outlets form matrices lying in substantially vertical planes and at a plurality of vertical heights, and wherein product entry to said inlets is located at uppermost ones of said heights and product exit is from outlets at intermediate heights.

6. An apparatus according to claim 4 wherein said means for individualizing includes pallet removal from supply units and said line assembly station includes placing an assembled unit on a pallet from said means for individualizing, and wherein one of said means for individualizing or said line assembly station is positioned above the other.

7. An apparatus according to claim 4 and further comprising means for storing supply units and assembled lines, and conveying means for transporting supply units and assembled lines to and from said means for storing.

* * * * *